Figure 1:
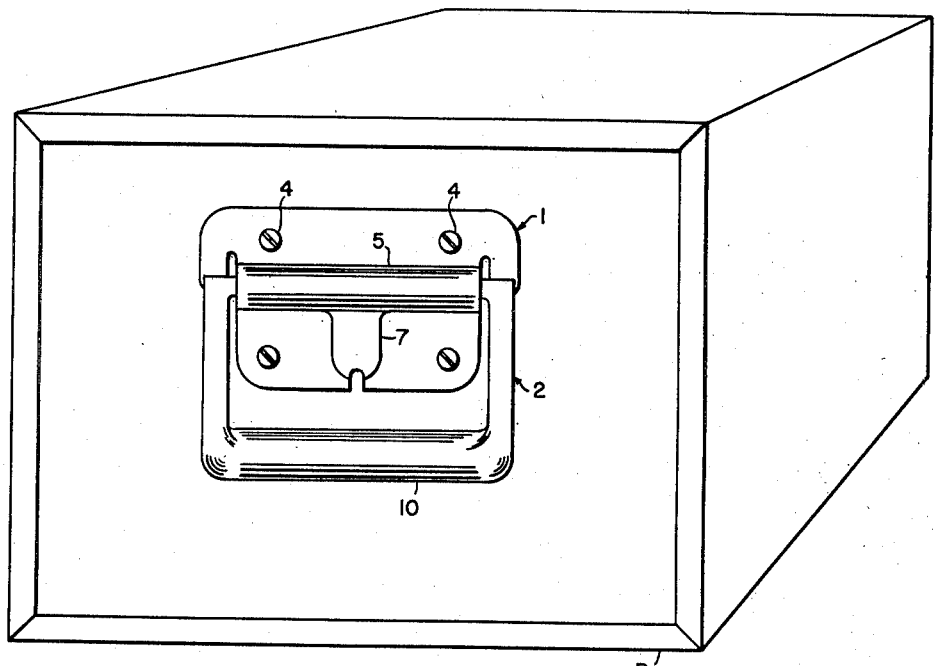

Oct. 23, 1956 W. J. KNUEPFER 2,767,424
CARRYING HANDLE
Filed Sept. 20, 1954

United States Patent Office 2,767,424
Patented Oct. 23, 1956

2,767,424

CARRYING HANDLE

Walter J. Knuepfer, La Grange, Ill., assignor to International Telephone and Telegraph Corporation, a corporation of Maryland Application September 20, 1954, Serial No. 457,060

2 Claims. (Cl. 16—126)

The principal object of the invention is to provide a two-piece carrying handle which is of a compact and rigid construction.

In known carrying-handle construction, a generally C-shaped handle is commonly secured in a pendant position by a plate-like bracket adapted to be mounted on an upright surface of a portable case or other object, with portions of the bracket receiving the inwardly extending end portions of the handle. In this type of handle construction, either a third member is used or the handle is of flexible material to enable it to be sprung apart for entry into openings in the bracket.

According to the invention, a handle of rigid and rugged construction may be retained in assembly with a bracket plate without a third member, by using a bracket construction wherein extensions of the bracket lie behind the inwardly extending handle portions and are disposed outwardly of the ends of a handle-receiving horizontal channel formed by an outwardly offset portion of the bracket.

Further, according to the invention, the improved handle assembly includes a concealed handle-restoring coiled spring which comprises the third member of the assembly and serves to retain the handle normally in its non-use position.

The foregoing features of construction are of particular importance in handles for portable field equipment, where ruggedness and simplicity are practical necessities.

Referring to the drawings, comprising Figs. 1 to 4, Fig. 1 shows a portable case equipped with a carrying handle assembly incorporating the invention.

Figures 2, 3, 4:
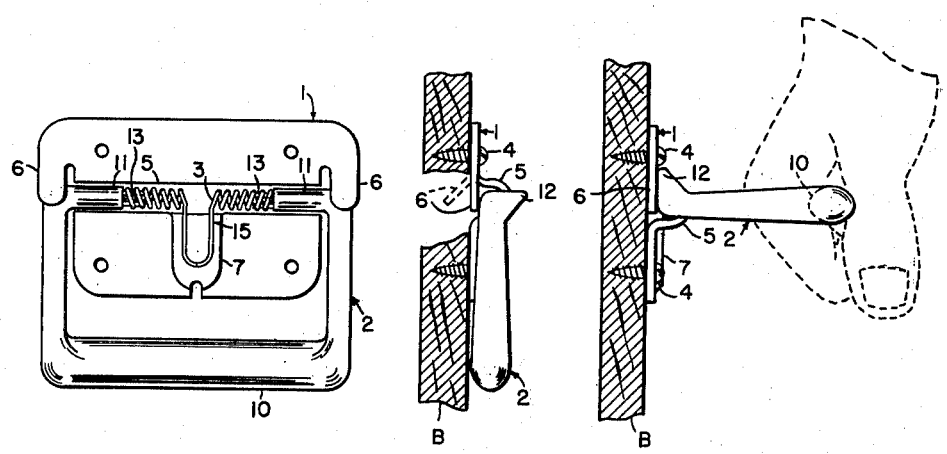

Figs. 2 and 3 show respectively a rear view and a side view of the assembly of Fig. 1; and Fig. 4 is a side view of the assembly with the carrying handle raised to its carrying position.

In Fig. 1, the carrying handle assembly is shown as applied to an upright end surface of a portable case B by screws 4. It comprises plate-like bracket 1, handle 2, and concealed handle-restoring spring 3, seen from the rear of the assembly, as shown in Fig. 2.

Bracket 1, being generally flat, may be formed of any suitable sheet material such as a high-strength aluminum alloy. Its intermediate portion is offset forwardly at 5 to provide a horizontal channel lying forward of the main bracket 1 and open at both ends.

Handle 2 is a strong and rigid part, and is preferably cast or otherwise formed of a strong and light-weight material, such as an aluminum alloy. It is generally C-shaped and has an enlarged grip portion 10. Its remote inwardly extending end portions 11 enter the open ends of the channel at 5 to hinge the handle in the bracket.

Bracket 1 further has tabs 6 pendant from its widened upper portion to engage the assembled handle 2 to keep it from moving rearwardly out of the channel at 5. Before assembly of parts 1 and 2, tabs 6 may be formed rearwardly as shown in dotted outline in Fig. 3 to allow the handle to enter the channel, following which tabs 6 are straightened to their illustrated full-line position.

Referring to Fig. 2, spring 3 is in two coils connected by an offset key portion 15 which lies within the forwardly offset at 7, which comprises a shallow downward central extension of the cross channel at 5.

The inner (end) sections of horizontal portions 11 of the handle are of reduced diameter and are received within the coils of restoring spring 3, which has an outside diameter similar to that of the unreduced sections of portions 11. The wire at each coil end of the spring extends across the coil as a torsion key. These keys are received within the cross slots 13 in the reduced end portions to key the spring ends to the handle 2 for a downward rotational tension to hold the handle 2 retracted to the position shown in Figs. 1 and 3.

When the carrying handle 2 is grasped and lifted, it rotates within bracket 1, and against the tension of spring 3, to the outward carrying position shown in Fig. 4, in which position it is stopped by engagement of its angular extensions 12 with the surface of bracket 1. In this position of the handle, a firm and unobstructed carrying hold on grip portion 10 may be secured.

When the handle 2 is released, spring 3 returns it to, and holds it in, the position shown in Figs. 1 to 3.

I claim:

1. A two-piece handle assembly comprising a single-piece plate-like bracket and a single-piece handle, the bracket comprising a flat main portion having a front side adapted to lie exposed when the assembly is in applied position and having a back side adapted to be secured in contact with an exposed upright surface of a portable case or other object, the bracket also having an intermediate portion which is offset forwardly to provide a horizontal channel lying forwardly of the main portion of the bracket and open at both ends, the said main portion comprising two flat sections for which the said intermediate portion is the sole connecting means, the handle being generally C-shaped to provide a horizontal grip portion and two remote inwardly extending hinge-pin end portions which enter the respective open ends of the channel to hinge the handle therein to enable the grip portion to be raised and lowered by rotation of the handle about an axis lying within the hinge-pin portions, the main portion of the bracket including keeper members associated respectively with the ends of the channel and located outwardly beyond them, each keeper member comprising a subsection of one of the said sections and being flat with the remainder of its section and with the other said section, the keeper members serving to retain the hinge-pin portions within the channel by blocking rearward movement thereof.

2. In a two-piece handle assembly according to claim 1, the single-piece handle including stop portions fixed therewith and associated respectively with the said keeper members, each stop portion providing a stop surface which is disposed radially outwardly from the said axis at a location along the axis which is opposite its associated keeper member, each stop surface being so located angularly about the said axis with respect to the grip portion that it engages its associated keeper member responsive to the grip portion being raised to a carrying position.

References Cited in the file of this patent

UNITED STATES PATENTS

| | | |
|---|---|---|
| 372,900 | Doty | Nov. 8, 1887 |
| 1,094,820 | Sargent | Apr. 28, 1914 |
| 2,371,557 | Sullivan | Mar. 13, 1945 |

FOREIGN PATENTS

| | | |
|---|---|---|
| 567 | Great Britain | Sept. 5, 1912 |